United States Patent
Gomes et al.

(10) Patent No.: US 8,804,634 B2
(45) Date of Patent: Aug. 12, 2014

(54) METHOD AND APPARATUS FOR MANAGING CSG PRIORITIES IN IDLE AND CONNECTED MODES

(75) Inventors: Sylvie Gomes, Douglaston, NY (US); Diana Pani, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 54 days.

(21) Appl. No.: 12/987,667

(22) Filed: Jan. 10, 2011

(65) Prior Publication Data

US 2011/0170481 A1 Jul. 14, 2011

Related U.S. Application Data

(60) Provisional application No. 61/293,497, filed on Jan. 8, 2010.

(51) Int. Cl.
*H04W 4/00* (2009.01)

(52) U.S. Cl.
USPC ........... 370/329; 379/331; 379/353; 379/354; 455/436; 455/439; 455/442

(58) Field of Classification Search
USPC .......... 370/331, 353, 354; 455/436, 439, 442, 455/33.2
See application file for complete search history.

(56) References Cited

U.S. PATENT DOCUMENTS

| | | | |
|---|---|---|---|
| 8,588,738 B2 | 11/2013 | Gholmieh et al. | |
| 2005/0122919 A1* | 6/2005 | Touag | 370/310 |
| 2009/0238117 A1* | 9/2009 | Somasundaram et al. | 370/328 |
| 2009/0305699 A1 | 12/2009 | Deshpande et al. | |
| 2010/0110945 A1 | 5/2010 | Koskela et al. | |
| 2010/0291927 A1* | 11/2010 | Wu et al. | 455/435.3 |
| 2011/0105083 A1* | 5/2011 | Wu | 455/411 |
| 2011/0105127 A1* | 5/2011 | Wu | 455/438 |
| 2011/0143738 A1* | 6/2011 | Kone | 455/418 |
| 2011/0212729 A1* | 9/2011 | Li et al. | 455/450 |
| 2011/0269460 A1* | 11/2011 | Dalsgaard et al. | 455/435.1 |

FOREIGN PATENT DOCUMENTS

| | | |
|---|---|---|
| JP | 2004120080 A2 | 4/2004 |
| WO | WO 2009007720 A2 * | 1/2009 |

OTHER PUBLICATIONS

3GPP TSG SA WG1, "LS on CSG Priorities and Manual CSG Selection," R2-094145, 3GPP TSG RAN WG2 Meeting #67, Shenzhen, China, Aug. 24-28, 2009.
LG Electronics, Inc., "CSG cell detection," 3GPP TSG-RAN2 Meeting #68, R2-097012 (Nov. 9-14, 2009).
Motorola, "CSG Priority," R2-094640, 3GPP TSG RAN WG2 Meeting #67, Shenzhen, China, Aug. 24-28, 2009.
Nokia Siemens Networks et al., "Common Channel Measurements," 3GPP TSG-RAN WG2 Meeting#68, R2-097021 (Nov. 9-13, 2009).

(Continued)

*Primary Examiner* — Kibrom T Hailu
*Assistant Examiner* — Zewdu A Beyen
(74) *Attorney, Agent, or Firm* — Volpe and Koenig, P.C.

(57) ABSTRACT

A method comprising detecting closed subscriber group (CSG) proximity based on an autonomous search function; signaling a proximity indication to a network, wherein the proximity indication includes at least one priority of at least one allowed neighbor CSG cell. A method comprising, performing measurements on neighboring CSG cells; and generating a measurement report including measurements of at least one neighboring CSG cell; and transmitting a message including a measurement report and a CSG priority for at least one CSG cell.

8 Claims, 6 Drawing Sheets

(56) References Cited

OTHER PUBLICATIONS

NTT Docomo, Inc., "Introduction of proximity indication to support CSG inbound mobility," 3GPP TSG-RAN WG2 Meeting #68, R2-097005 (Nov. 9-13, 2009).

Panasonic, "CSG measurement with proximity indication," 3GPP TSG RAN WG2#67, R2-094188 (Aug. 24-28, 2009).

RAN WG2, "Response on LS on CSG Priorities and Manual CSG Selection," R2-096285, 3GPP TSG RAN WG2 #67bis, Miyazaki, Japan, Oct. 12-16, 2009.

Vodafone, "Scope of Proximity Indication," 3GPP TSG RAN WG2 #68, R2-096586 (Nov. 9-13, 2009).

Nokia Siemens Networks et al., "Common Channel Measurements," 3GPP TSG-RAN WG2 Meeting #68, R2-097021 (Nov. 9-13, 2009).

RAN WG2, "Response on LS on CSG Priorities and Manual CSG Selection," R2-096285, 3GPP TSG RAN WG2#67bis, Miyazaki, Japan, Oct. 12-16, 2009.

Huawei Technologies Co., Ltd, "Support of inbound mobility to CSG cells," 3GPP TSG-GERAN Meeting #44, GP-091946, Sophia Antipolis, France (Nov. 16-20, 2009).

Third Generation Partnership Project, "Technical Specification Group Radio Access Network; Mobility Procedures for Home NodeB; Overall Description; Stage 2 (Release 9)," 3GPP TS 25.367 V9.2.0 (Dec. 2009).

* cited by examiner

METHOD AND APPARATUS FOR MANAGING CSG PRIORITIES IN IDLE AND CONNECTED MODES

CROSS REFERENCE TO RELATED APPLICATIONS

This application claims the benefit of U.S. provisional application No. 61/293,497 filed Jan. 8, 2010, the contents of which is hereby incorporated by reference herein.

BACKGROUND

A Home Node-B or a Home e-Node B (hereinafter collectively referred to as Home Node-Bs (HNBs)), refers to a device that may be similar to a wireless local area network (WLAN) access point (AP). The HNB provides users with access to cellular services over small service areas, such as homes or small offices. The HNB may connect to the operators' core network by using, for example, an internet connection (e.g. digital subscriber line (DSL)).

A HNB closed subscriber group (CSG) cell may refer to an area over which radio coverage provided by the HNB may be accessed by a group of subscribers authorized to use the services of the cell. These authorized wireless transmit/receive units (WTRUs) are called members of the CSG cell. The CSG may comprise a family or anyone in the vicinity of a particular location attempting to access the HNB CSG cell. The subscriber may deploy a CSG cell using a HNB over an area where such service is desired. Each WTRU may store a white list ("Allowed CSG List") which includes the CSG Ids of the CSG cells it is authorized to access. A hybrid cell is a cell that works like a CSG cell for member WTRUs and like an open cell for non-member WTRUs.

SUMMARY

A method implemented in a WTRU operating in connected mode, the method comprising detecting CSG proximity based on an autonomous search function; signaling a proximity indication to a network, wherein the proximity indication includes at least one priority of at least one allowed neighbor CSG cell.

A method implemented in a WTRU operating in connected mode, the method comprising, performing measurements on neighboring CSG cells; and generating a measurement report including measurements of at least one neighboring CSG cell; and transmitting a message including a measurement report and a CSG priority for at least one CSG cell.

BRIEF DESCRIPTION OF THE DRAWINGS

A more detailed understanding may be had from the following description, given by way of example in conjunction with the accompanying drawings wherein.

DETAILED DESCRIPTION

Figure 1A:
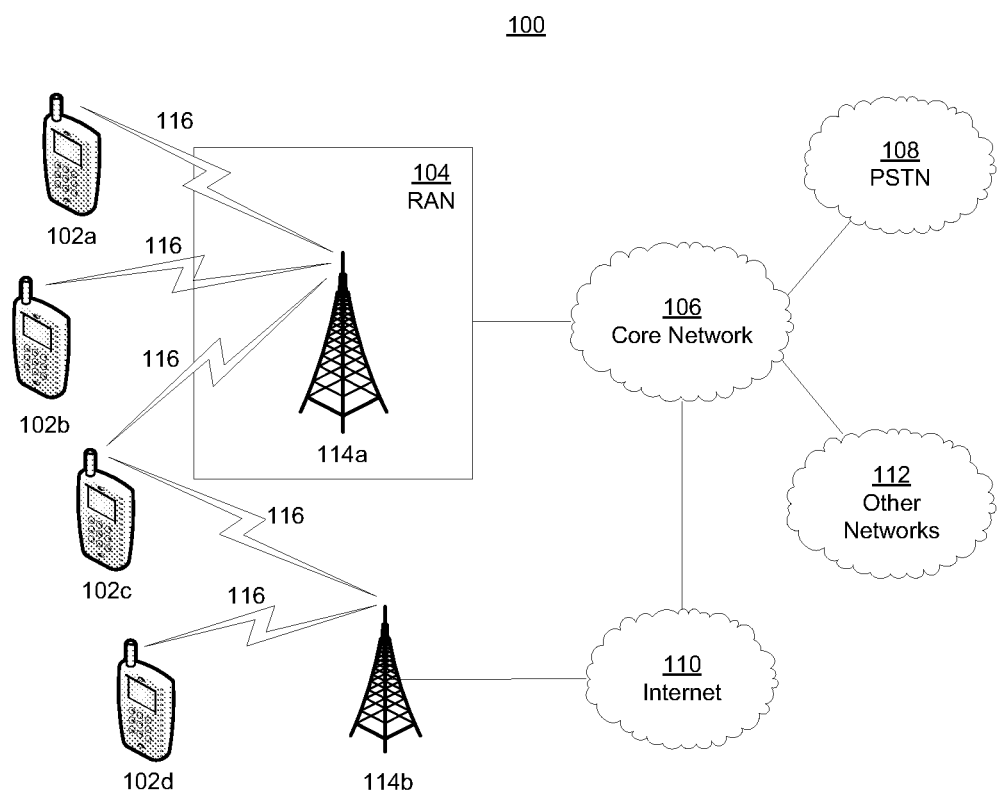
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
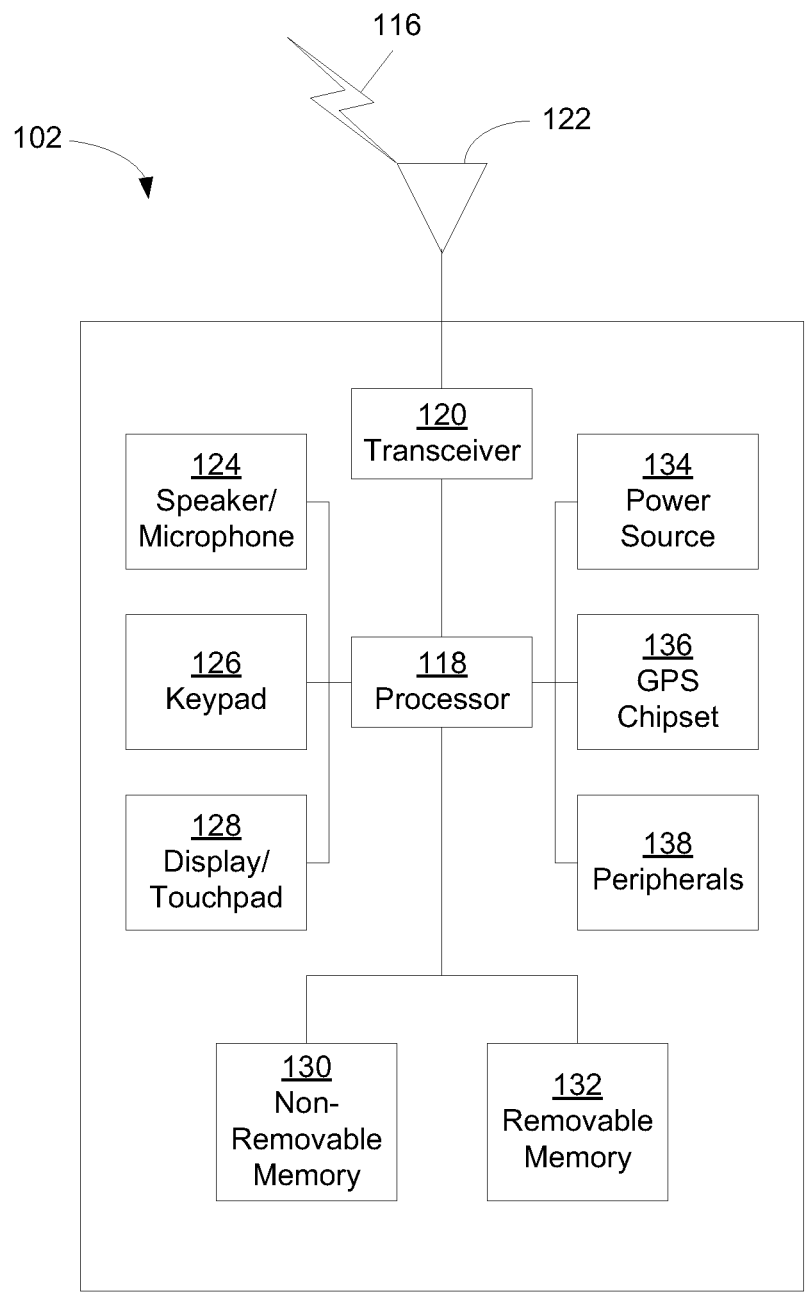
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
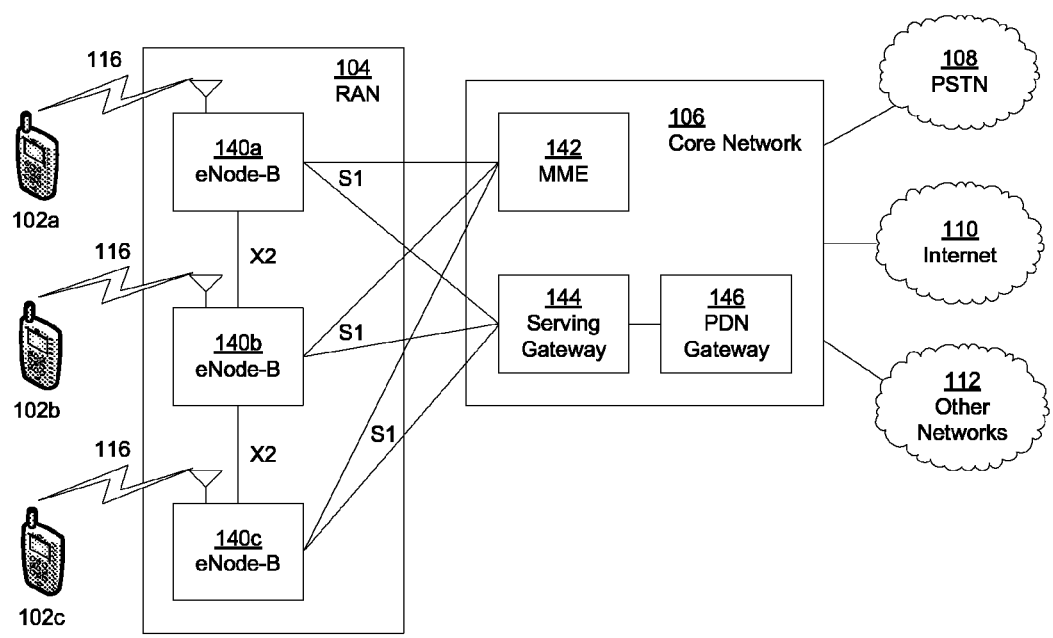
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

When referred to hereafter, the term "signal quality" may refer to a measurement taken by the WTRU that measures the quality of the signal from a cell. This may correspond to, e.g., RSRQ or CPICH Ec/No. When referred to hereafter, "received signal power" from a cell may refer to RSRP or CPICH RSCP.

When referred to hereafter, CSG Id refers to CSG Identity and CGI refers to Cell Global Identity.

CSG mobility procedures in Idle mode and connected mode may be modified in order to incorporate the processing of the CSG priorities, including cell selection, cell reselection and handover to a CSG cell (i.e. inbound handover) procedures.

In the actual state of the cell reselection procedure, the highest ranked cell in a frequency may be selected by a WTRU. With the use of CSG priorities, the user may prefer to camp on a lower ranked CSG cell which has the highest priority and this could result in interferences issues. Regarding the handover to a CSG cell, the decisions on which target CSG cell to select are made by the network which should be made aware of the CSG priorities for a particular WTRU in order to give preference to the highest priority CSG cell whenever possible (e.g. if it does not create too many interferences).

Figure 2:
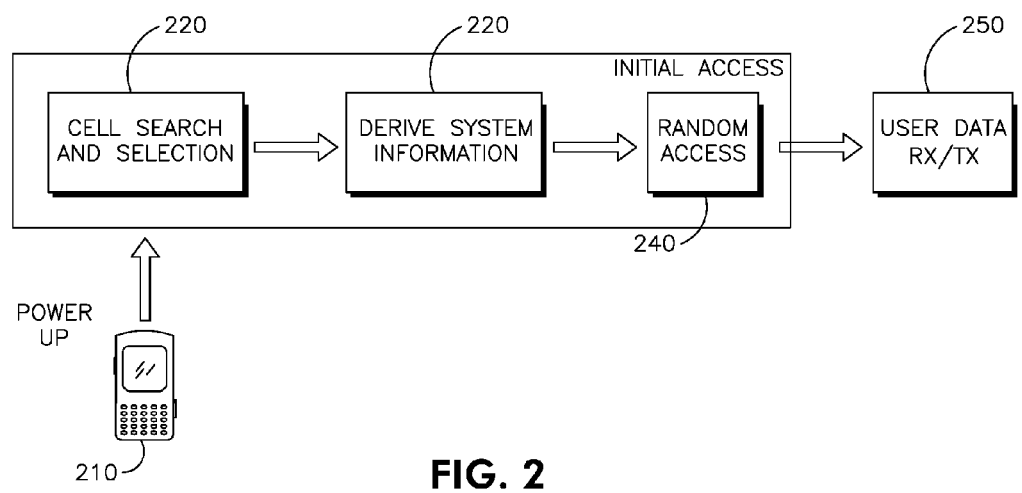
FIG. 2 shows a flow diagram of an example initial access procedure.

FIG. 2 shows a flow diagram of an example initial access procedure. A WTRU is powered on, activating a cell search and selection procedure. The WTRU then acquires the System Information (SI). Using the SI, a Random Access Procedure is initiated. Once the random access procedure is successful, the WTRU may send and receive user data.

Once a WTRU is powered on, the WTRU is configured to perform measurements for cell selection and reselection purposes. For example, the WTRU may be configured to measure the Reference Signal Received Power (RSRP) level of the serving cell and evaluate the cell selection criterion S for the serving cell at each Discontinuous Reception (DRX) cycle. The WTRU may filter the RSRP measurements of the serving cell using additional measurements. If the WTRU has determined over a predetermined number of consecutive DRX cycles that the serving cell does not fulfill the cell selection criterion S, the WTRU may initiate the measurements of neighbor cells indicated by the serving cell.

The non-access stratum (NAS) protocols can control the radio access technology (RAT)(s) in which the cell selection should be performed, for instance by indicating RAT(s) associated with the selected public land mobile network (PLMN), and by maintaining a list of forbidden registration area(s) and a list of equivalent PLMNs. The WTRU may then select a suitable cell based on idle mode measurements and cell selection criteria. In order to speed up the cell selection process, stored information for several RATs may be available in the WTRU. When camped on a cell, the WTRU may regularly search for a better cell according to the cell reselection criteria. If a better cell is found, that cell may be selected.

The NAS may be informed if the cell selection and reselection results in changes in the received system information relevant for NAS.

For normal service, the WTRU may camp on a suitable cell, tune to that cell's control channels and it may receive system information and registration area information from the PLMN, receive other access stratum (AS) and NAS Information; and, if registered, receive paging and notification messages from the PLMN.

Figure 3:
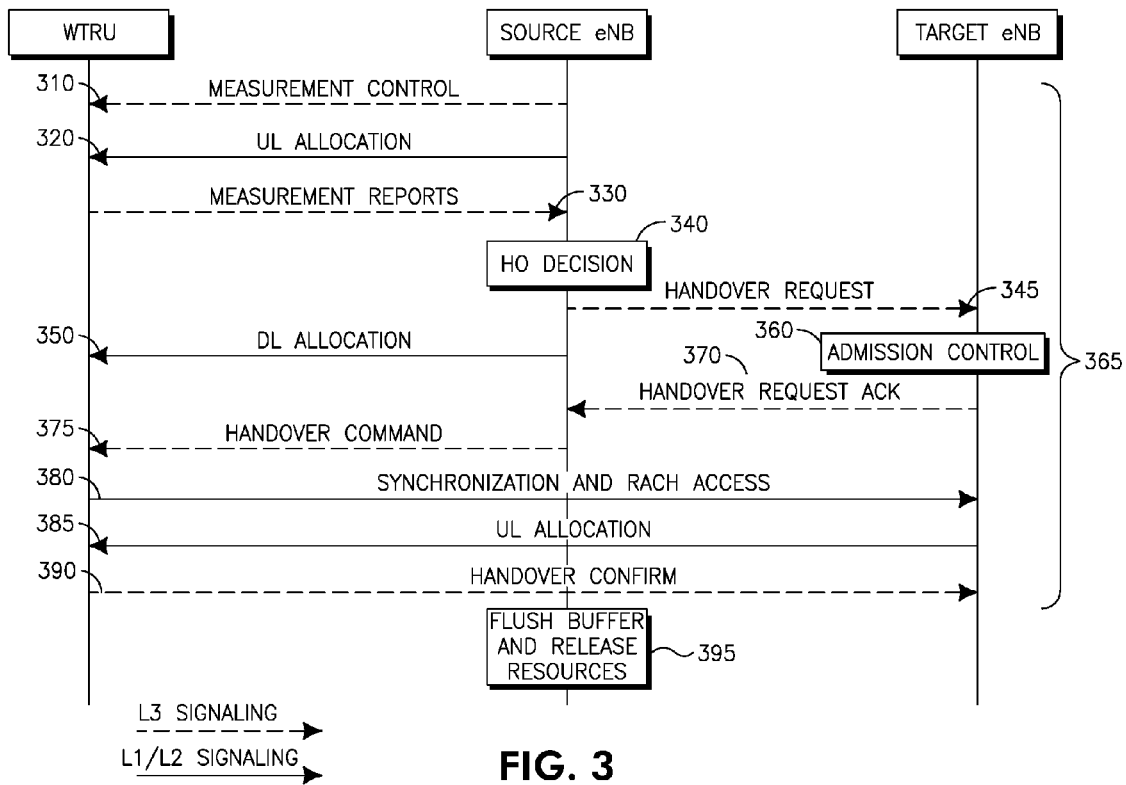
FIG. 3 shows an example reselection procedure.

FIG. 3 shows an example reselection procedure. The WTRU receives measurement control information and UL allocation information (310, 320). The WTRU transmits measurement reports to the source eNB (330). The source eNB may then generate a handoff decision and then send a handover request to the target eNB (340, 345). The target eNB performs admission control (360) and the WTRU is granted a DL allocation (350). The target eNB may then transmit a Handover Request ACK back to the Source eNB which in turn may send a handover command to the WTRU (370, 375). After the handover command is received, the WTRU may then initiate a synchronization and RACH access procedure with the target eNB (380), after which an UL allocation is granted (385). Based on the measurement reports, a handover/reselection decision may be determined (390). The WTRU may then receive a handover command, after which it may then reinitiate the synchronization and RACH procedures. Once handover is performed the source eNB may flush its buffer and release resources (395). Optionally, the source eNB may be configured to maintain the resources for a period of time so the WTRU is able to quickly reselect back to the source eNB.

A cell-ranking criterion for serving cells ($R_s$) and the cell ranking criterion for neighboring cells ($R_n$) may be described by the following:

$$R_s = Q_{meas,s} + Q_{Hyst}$$

$$R_n = Q_{meas,n} - Q_{offset}$$

Where $Q_{meas}$ is the RSRP measurement quantity used in cell reselections. And for intra-frequency Qoffset=$Qoffset_{s,n}$, if $Qoffset_{s,n}$ is valid, otherwise it is equal to zero. For inter-frequency Qoffset=$Qoffset_{s,n}$+$Qoffset_{frequency}$ if $Qoffset_{s,n}$ is valid, otherwise it equals $Qoffset_{frequency}$. $Qoffset_{s,n}$ specifies the offset between the two cells. $Q_{hyst}$ specifies the hysteresis value for ranking criteria. $Qoffset_{frequency}$ is a frequency specific offset for equal priority E-UTRAN frequencies. These parameters may be signaled by the serving cell.

The WTRU may perform ranking of all cells that fulfill a predetermined cell selection. The WTRU may exclude CSG cells that are known by the WTRU to be not allowed. The cells shall be ranked according to the predetermined criteria, deriving $Qmeas_n$ and $Qmeas_s$ and calculating the R values using averaged RSRP results.

CSG Priorities in Idle Mode

For a WTRU in Idle mode, the cell selection/reselection procedure may be configured to account for CSG priorities.

Figure 4:
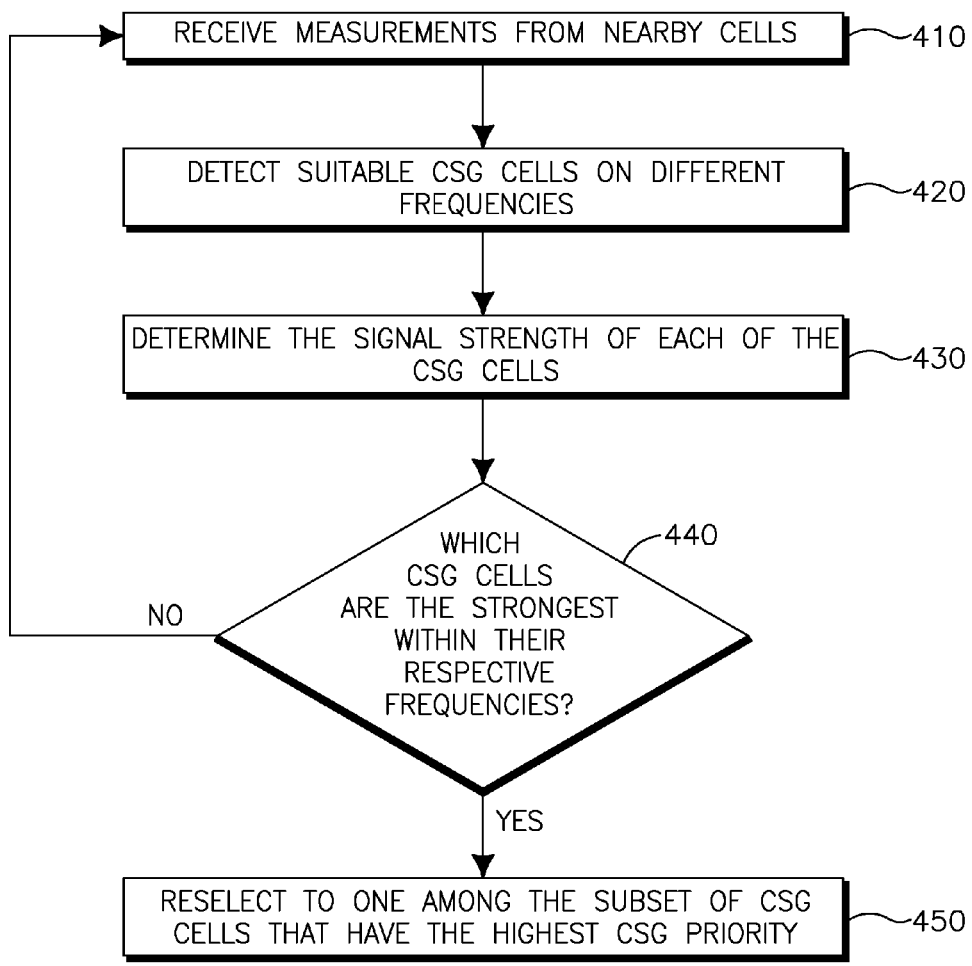
FIG. 4 is a flow diagram showing a method for cell reselection with CSG cells for the inter-frequency scenario and/or for the inter-RAT scenario.

FIG. 4 is a flow diagram showing a method for cell reselection with CSG cells for the inter-frequency scenario and/or for the inter-RAT scenario. In this scenario, the current serving cell and target CSG cell are on different frequencies and/or the current serving cell and target CSG cell belong to a different RAT. The WTRU receives measurements from nearby cells (410). The WTRU detects suitable CSG cells on different frequencies (420). Alternatively, the WTRU may only select CSG cells in which the CSG ID is a part of its white list. The CSG ID may be acquired in the cell system information. The WTRU determines the signal strength of each of the CSG cells (430). The signal strength may be determined based on RSRP or CPICH RSCP. For cell selection/reselection, the WTRU may also measure the cell quality, i.e. RSRQ and CPICH Ec/NO. The WTRU then determines whether these CSG cells are the strongest within their respective frequencies (440). If the CSG cells are the strongest of their respective frequencies, then the WTRU reselects to one among the subset of CSG cells that have the highest CSG priority (450).

In case there is more than one cell the selected subset of CSG cells, the WTRU may be configured to perform additional procedures to select one of them. In a first method, the WTRU may select one cell arbitrarily, (e.g. according to a random function). Alternatively, if the CSG priorities have different levels of priorities (i.e. sub-priorities etc. . . . ). If more than one CSG cell has the same priority at a given level of the hierarchy, the WTRU may check the next level of priority of these CSG cells and reselect the CSG cell which has the highest sub-level priority. In some instances, the number of priority levels may not be limited and the WTRU may be configured to check different depths of CSG sub-priorities. If among these cells, several CSG cells have the highest CSG priorities and the highest CSG sub-priorities, then the WTRU may reselect to any of them arbitrarily, e.g. according to a random function.

In another embodiment, a WTRU may be configured for a cell selection procedure for the intra-frequency, inter-frequency and the inter-RAT scenarios. The WTRU receives measurements from nearby cells. The WTRU may be configured to rank the priorities of each of the nearby cells based on signal strength and other metrics. The WTRU may be configured to reselect to a suitable CSG cell if it has the highest priority and even if the CSG cell is not the highest ranked on its frequency and (for the intra-frequency case) even if it is not higher ranked than the current serving cell. For example, the WTRU may reselect a high-priority CSG cell which is not the best ranked on its frequency, if all cells that are better ranked than this CSG cell are other CSG cells (of lower priority, or of lower or equal priority). This condition may protect the open cells (e.g. a macro-cellular network) from interference. Another condition may require that cells that are higher ranked than the high-priority CSG cell to be selected are signaling that intra-frequency reselection to a lower ranked cell is allowed as per the intra-frequency reselection indicator (IFRI) information element. The WTRU may be allowed to reselect to a lower ranked cell if the above conditions are met and the signal quality of the target cell is above a predetermined threshold and/or the signal quality of the target cell is not lower than the highest ranked cell by a predetermined threshold, for a predetermined period of time.

Other conditions on the received signal power and/or on the signal quality of the suitable CSG cell may be used. Thus, an offset may be defined which may be called for example CSG_offset_intra for the intra-frequency case and for example CSG_offset_inter for the inter-frequency case that the WTRU may use to compare the received signal power and/or the signal quality of the suitable CSG cell having the highest priority with the highest ranked cell. If the {received signal power and/or the signal quality of the suitable CSG cell with highest CSG priority} is higher than {the received signal power and/or the signal quality of the best ranked cell minus CSG_offset_intra for the intra-frequency case or minus CSG_offset_inter for the inter-frequency case}, then the WTRU may reselect this highest priority suitable CSG cell. The values for CSG_offset_intra and CSG_offset_inter may be identical or different depending on the scenario.

Alternatively, a CSG priority offset may be introduced in the cell reselection ranking criteria so that the suitable CSG cells with the highest CSG priority have a better rank. In this scenario, if a suitable cell has a CSG priority and this CSG priority is the highest among the suitable cells having a CSG priority, then the WTRU may add an offset (e.g. CSG_offset_priority) to the cell-ranking criterion Rn calculated for this neighboring CSG cell.

Alternatively, an absolute minimum received power level or received quality for a non-best-ranked CSG cell with highest priority may be defined. The WTRU may select the highest priority CSG cell, even if it is not the best ranked, provided that its absolute received power level or received signal quality is higher than a threshold (CSGminpwr, CSGminqual).

These parameters (e.g. CSG_offset_intra, CSG_offset_inter, CSG_offset_priority, CSGminpwr, CSGminqual) may be pre-configured in the WTRU as constant values, or be determined by the WTRU, or be indicated by the network in the broadcast data (i.e. SI), or be signaled by the network in an Radio Resource Control (RRC) message or in a new message, or these offsets may be set by a combination of the previous methods.

If cell reselection fails with the highest priority CSG cell (e.g. the WTRU cannot read the SI of this cell), the WTRU may be configured to reselect the next priority suitable CSG cell. Alternatively, this may be allowed if the CSG cell is signaling that intra-frequency reselection to a lower ranked cell is allowed as per the intra-frequency reselection indicator (IFRI) information element.

If two CSG cells have the same priority, the WTRU may check the sub-priorities in order to reselect the CSG cell with the highest sub-priorities. But if the sub-priorities are also the highest for several CSG cells having the highest priority, then the WTRU may reselect among these cells the CSG cell with the best signal quality or the best received signal level.

In order to avoid cell reselection ping-pong issues, a WTRU, after reselecting a CSG cell with highest priority, may remain camped on this cell until the cell does not fulfill the criteria of suitability, or until another CSG of even higher priority is suitable and fulfill the criteria of cell reselection described above.

Alternatively, an offset may be introduced to the cell-ranking criterion Rs for the serving cell when the serving cell is a CSG cell with highest priority, to force the WTRU to remain camped on this CSG cell for a longer period of time than with the original ranking criteria $R_s$.

The user may also be able to force the WTRU to manually reselect a suitable CSG cell of a lower priority or to a CSG cell which has not been assigned any CSG priority.

In a multi-frequency deployment, CSG cells may have different CSG identities and HNBs may belong to different users/operators deployed in different frequencies. Therefore, the WTRU may be camped or connected to the highest frequency priority in the current CSG, however, the WTRU may be aware that other CSG cells in a lower priority frequency and/or RAT are in the vicinity that have a higher CSG priority than the current frequency. In such situations, the WTRU may consider the frequency in which the highest priority CSG is available in the vicinity as the highest priority frequency. If CSG cells with a higher priorities are available in the vicinity on other frequency or RAT, the WTRU may start measuring on the other frequencies even if the current serving frequency is considered (or is configured as) the highest priority frequency or it is a higher priority frequency than the priority of the target CSG. Therefore the WTRU may start measuring even if the quality of the current serving cell is above the required threshold.

When measuring the other frequencies, if more than one CSG priority is available, the WTRU may start measuring first the frequency in which the highest priority CSG is located. Otherwise, the normal frequency priorities may be followed.

The WTRU may be configured to detect CSG proximity based on an autonomous search function. Alternatively, the WTRU may use other methods for the fingerprint, including stored location coordinates based on the use of a GPS signal or a stored list of macro cells PSC/PCI. The WTRU may report CSG proximity indication to the network. This signaling may indicate that the WTRU is entering or leaving the proximity of one or more cells that have CSG IDs included in the WTRU's CSG whitelist. The proximity indication may be sent in response to sending/receiving RRC connection reconfiguration signaling. The WTRU may periodically update a priority or set of priorities including CSG cells that are part of the WTRU white list with a fingerprint matching the current neighborhood of the WTRU, these may be referred to as "allowed neighbor CSG cells". When entering and leaving proximity indications, the WTRU may add the priority or set of priorities of the allowed neighbor CSG cells when available, in the signal conveying this CSG proximity indication. A field may be included in a Proximity Indication message to add a list of the priorities corresponding to these CSG cells. Alternatively, a field may be added in the MEASUREMENT REPORT message at the message level or in the IE "CSG Proximity Indication" to add this list of CSG priorities. Alternatively, instead of a list, the WTRU may report one CSG priority which may correspond to the highest CSG priority.

The WTRU may also send a proximity indication on a condition that there are CSG cells of a CSG priority higher than a threshold in the neighborhood. The CSG priority threshold may be provided by the network through higher layer signaling. This may allow the network to reduce the signaling load from the transmission of proximity indications.

Alternatively, if the WTRU enters a CSG area and more than one CSG is in the vicinity and the WTRU may only send one proximity indication frequency at a time, the WTRU may enter the frequency of the highest priority CSG in the vicinity in the entering proximity indication message.

In an alternate solution, if the WTRU is connected to a CSG cell and according to the fingerprint or autonomous search function or any location based function, is aware that other CSGs allowed in the white list are in the vicinity of serving cell the WTRU may trigger an entering proximity indication if the priority of the CSG in the vicinity is higher priority than the serving CSG. The WTRU may further be configured to trigger an entering proximity indication if the priority of the CSG in the vicinity is higher priority than the serving CSG and the CSG is in a different frequency layer or in a different RAT than the serving CSG. Alternatively, if the CSG in the vicinity is known to be located in the same frequency as the CSG it is currently connected to the WTRU may trigger a proximity indication irrespective of the priorities. The WTRU may trigger a proximity if the priority of the CSG in the vicinity is lower or equal priority than the serving CSG, but the signal quality of the serving CSG is below a threshold, for a determined period of time.

The same may be applicable for leaving proximity indication for the opposite scenario.

The WTRU may be configured to report neighboring cell measurements, or the WTRU may report only the measurements of the N highest priority neighboring CSG cells. When reporting the neighboring CSG cells measurements to the network, the WTRU may include the CSG priority for the CSG cells it is likely to be member to (i.e. CSG cells for which the WTRU has a fingerprint that matches their detected PSC/PCI) in the MEASUREMENT REPORT.

The WTRU may report all the CSG priorities and sub-priorities if available of all the measured CSG cells it is likely member to.

Alternatively, the WTRU may report the CSG priority for the CSG cells it is likely member to, having the highest CSG priority among the reported CSG cells. The WTRU may include the additional information element in case the CSG priority of the CSG cell it is likely member of is higher or equal than a minimum level of priority. Such minimum priority level may be provided by the network through RRC signaling. In this case, the additional information element may consist of the priority value itself, or of a Boolean.

The network may then decide to request the WTRU to only read the SI of the highest priority CSG cells. This may limit the WTRU battery usage and the signaling load in the next WTRU report.

In another implementation, if the WTRU is not aware of which CSG cells it is likely member to, the WTRU may include all the CSG priorities present in its white list, or only the highest CSG priorities in the MEASUREMENT REPORT.

Additionally, the WTRUs reporting of the CSG priorities may be configured by the network in an existing RRC message (e.g. the MEASUREMENT CONTROL) or in a new RRC message. The WTRU may report all the CSG priorities of only the likely member CSG cells; or only the likely member CSG cells having the highest priority; or all the CSG priorities in the WTRU white list; or only the highest CSG priorities in the WTRU white list.

In addition, the WTRU may be restricted to transmit the additional information only for a single CSG cell per measurement report. If this is the case, the WTRU may select the cell that has the highest CSG priority or (in case there is more than one such cell) the cell that is the best ranked among them.

Alternatively, in the case of autonomous SI acquisition or when more than on PSC/PCI has been requested to be read by the network, the WTRU may implicitly start reading the SI of the PCI/PSC of the known highest priority CSG.

The WTRU may be configured to detect CSG proximity based on an autonomous search function. The WTRU may then perform measurements on each of the detected CSGs. The WTRU may then attempt to read the SI of all of CSGs with predetermined signal strength. The WTRU may further be configured to include the CSG priority of the CSG cells it was able to read the SI for, in the MEASUREMENT REPORT message when reporting the SI of the neighboring CSG cells (e.g. the Cell Identity or CGI, the CSG Identity and the result of the preliminary access check member/not-member). The WTRU may use one or a combination of the following rules:

The WTRU may report the CSG priorities of all the CSG cells for which it was able to read the SI and of which it is a member (i.e. acquired CSG Identity in the SI of the concerned CSG cell matches one of the CSG Identities stored in the WTRU white list). In another embodiment, the WTRU may only report the CSG priorities of the highest CSG priority cells for which it was able to read the SI and of which it is a member (in order to limit the signaling load for example).

Alternatively, in a scenario where no PSC/PCI confusion exists or when the network does not request the WTRU to read the SI, the WTRU may report the CSG priorities known in the frequency or it may chose to report the highest priority CSG ID to the network.

In another solution, the WTRU may report the SI of only the highest priority CSG cells it is member of and include the CSG priorities in the measurement report.

Alternatively, when sending the measurement report to the network, the WTRU may use a one bit field that is set when the reported PSC/PCI may belong or it is the highest priority CSG in the set of reported cells.

When receiving the CSG priorities from the WTRU, the network may then give preference to the highest priority CSG cell for the handover. If some CSG cells reported have identical highest CSG priority (and CSG sub-priorities), the network may decide to select the CSG cell for which the WTRU has reported the best received signal power and/or signal quality. In case of potential interferences which would result in a handover to the highest CSG priority cell, the network may decide to handover the WTRU to a different CSG cell, which may be the next CSG priority cell reported by the WTRU if available. Alternatively, the network may still decide to handover the WTRU to the highest priority CSG cell, but may request the CSG cells with lower CSG priority to decrease their transmission power to limit the interferences towards the WTRU and may request the WTRU to lower its transmission power to limit the interferences towards the lower priority CSG cells. The network may have to take into account the fact that some CSG cells may have high priority for certain WTRUs and low priority for other WTRUs and manage the interferences accordingly to avoid any conflict.

In case of WTRU initiated SI reading (i.e. WTRU reading the SI of the CSG cells without being explicitly told by the network), the WTRU may avoid reading the SI of the lowest priority CSG cells in order to limit its battery usage. It may acquire only the SI of the highest CSG priority cell, or of cells with CSG priorities above than a threshold CSGminprio, or of the first N CSG cells having higher priority than the rest of the CSG cells. The values CSGminprio and N may be pre-configured in the WTRU, configurable by the user, determined by the WTRU or broadcasted or signaled by the network in an existing RRC message, like the measurement control or RRCConnectionReconfiguration for example, or in a new RRC message.

CSG priorities may be manually set by the user. When a new CSG Id is added in the WTRU white list, the user may be prompted to select a priority for this CSG. For CSGs already existing in the WTRU white list, the user may be prompted to set the priority of all the CSGs part of this white list the first time the WTRU is used or every time the WTRU is turned on. The user may have the possibility to configure the CSG priority of the CSG part of the WTRU white list at any time for a first time setting or for an update.

Additionally, the CSG priorities may be pre-configured by the operator, for example the user home CSG may always receive the highest priority. This CSG priority may also be set depending on the CSG type.

The CSG priorities may be dependent on the frequency layer. For instance, all CSG cells within a frequency may be constrained to have the same CSG priority. If such approach is adopted, the CSG priorities may be obtained using mechanisms similar to the ordinary frequency priorities—i.e. dedicated or common CSG priorities may be available.

The network may send the CSG priorities to the WTRU using an existing RRC message (e.g., RRC CONNECTION SETUP or MEASUREMENT CONTROL message or the RRCConnectionReconfiguration message or using a new RRC message).

The CSG priorities may be automatically updated by the WTRU depending on how often a user connects to a particular CSG cell. For example, the WTRU may detect that the user often connects to the home CSG cell, and increase its priority significantly; the WTRU may also detect that the user connects to a particular coffee shop CSG cell often and increase the corresponding CSG priority but not as much than for the home CSG cell.

An option to disable all or a subset of the CSG priorities may be available to the user. The network may also be able to disable the CSG priorities in the WTRU for interferences management purposes for example or for any other purpose (e.g. H(e)NB congestion, H(e)NB load management etc. . . . ). A CSG priority enabling and disabling IE may be added in an existing RRC message, for example in the MEASUREMENT CONTROL message, the RRCConnectionReconfiguration message, or a new RRC message may be defined.

A validity timer may be defined on the CSG priorities, per CSG or for all CSG having priorities, or for a sub-set of CSG. In addition, two types of priority may be defined: permanent and temporary. The permanent priority may be valid as long as the user or the network does not delete it, while the temporary priority may be valid during a pre-defined period of time. For example, the permanent priority may be used for the user home CSG cell, while the temporary priority may be used for the user's friend's CSG cell priority. The validity duration may be set by the user, automatically by the WTRU or signaled by the network in an existing RRC message or in a new RRC message.

If CSG priorities are optional (i.e. not all CSG are assigned a priority) and that some CSG cells have priorities assigned, while other CSG cells have not been assigned any priority, the WTRU may assume that the CSG cells without priorities have the lowest priority. Alternatively, the WTRU may assume that these CSG cells have a medium priority. In another implementation, it may be specified that in case CSG priorities are used, each CSG may be assigned a priority in the WTRU white list.

Since the white list may be composed of two different lists, the user allowed CSG list and the operator allowed CSG list, conflicts in the priorities may occur, i.e. the same CSG may have been assigned a different priority on the two lists. In this case, the WTRU may decide to only take into account the CSG priority defined in the operator allowed CSG list, or alternatively the WTRU may decide to only take into account the CSG priority defined in the user allowed CSG list. In a different implementation, the WTRU may compute a CSG priority average between the CSG priority defined in the user allowed CSG list and the CSG priority defined in the operator allowed CSG list, with identical weights or with more weight assigned to the CSG priority of one of the two lists.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented in a wireless transmit/receive unit (WTRU) operating in connected mode, the method comprising:
   detecting a home Node-B (HNB) closed subscriber group (CSG) cell proximity based on an autonomous search function;
   generating a CSG whitelist, wherein the whitelist includes information concerning a plurality of HNB CSG cells operating at a plurality of frequencies and a plurality of radio access technologies (RAT);
   assigning a priority to each cell included in the CSG whitelist based at least in part on a RAT associated with each cell; and signaling a message to a network, the message including a proximity indication and the assigned priorities, and the signaling further indicates that the WTRU is entering or leaving the proximity of at least one cell that has a CSG identification (ID) included in the CSG whitelist.

2. The method of claim 1, wherein the proximity indication is transmitted on a condition that at least one CSG cell has a priority above a predetermined threshold.

3. The method of claim 1, a proximity indication is transmitted for each frequency in which there are CSGs in a predetermined area.

4. The method of claim 1, wherein the plurality of HNB CSG cells includes a Long Term Evolution (LTE) cell.

5. A wireless transmit/receive unit (WTRU) comprising:
   circuitry configured to detect CSG cell proximity based on an autonomous search function;
   circuitry configured to store a CSG whitelist, wherein the whitelist includes information concerning a plurality of HNB CSG cells operating at a plurality of frequencies and a plurality of radio access technologies (RAT);
   assigning a CSG priority to each cell includes in the CSG whitelist based at least in part on a RAT associated with each cell; and
   circuitry configured to generate a message, the message containing a proximity indication to a network and the assigned priorities, wherein the message further indicates that the WTRU is entering or leaving the proximity of at least one cell that has CSG IDs included in the CSG whitelist.

6. The WTRU of claim 5, wherein the proximity indication is transmitted on a condition that at least one CSG cell has a priority above a predetermined threshold.

7. The WTRU of claim 5, a proximity indication is transmitted for each frequency in which there are CSGs in a predetermined area.

8. The WTRU of claim 5, wherein the plurality of HNB CSG cells includes a Long Term Evolution (LTE) cell.

* * * * *